(12) United States Patent
Olin et al.

(10) Patent No.: US 12,162,529 B2
(45) Date of Patent: Dec. 10, 2024

(54) ADJUSTABLE HANDLEBAR RISER

(71) Applicant: Arctic Cat Inc., Thief River Falls, MN (US)

(72) Inventors: Chris Michael Olin, Cohasset, MN (US); Peder Randal Cudrio Erickson, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 18/299,287

(22) Filed: Apr. 12, 2023

(65) Prior Publication Data

US 2024/0083490 A1   Mar. 14, 2024

Related U.S. Application Data

(60) Provisional application No. 63/404,613, filed on Sep. 8, 2022.

(51) Int. Cl.
| | |
|---|---|
| *B62D 1/185* | (2006.01) |
| *B62D 1/184* | (2006.01) |
| *B62K 11/14* | (2006.01) |
| *B62K 21/12* | (2006.01) |
| *B62K 21/22* | (2006.01) |

(52) U.S. Cl.
CPC ............ *B62D 1/185* (2013.01); *B62D 1/184* (2013.01); *B62K 11/14* (2013.01); *B62K 21/125* (2013.01); *B62K 21/22* (2013.01); *Y10T 74/20792* (2015.01)

(58) Field of Classification Search
CPC ........ B62D 1/185; B62D 1/184; B62K 11/14; B62K 21/125; B62K 21/22; Y10T 74/20792
See application file for complete search history.

(56) References Cited

U.S. PATENT DOCUMENTS

| | | | |
|---|---|---|---|
| 613,970 | A | 11/1898 | Christy |
| 3,211,482 | A | 10/1965 | Sorenson |
| 3,402,952 | A | 9/1968 | Nissen et al. |
| 4,924,725 | A | 5/1990 | Takahashi et al. |
| 6,929,278 | B2 * | 8/2005 | Väisanen ................ B62M 27/02 280/279 |
| 7,685,904 | B2 | 3/2010 | Cutsforth |
| 8,215,201 | B2 | 7/2012 | Schindler et al. |
| 8,381,611 | B2 | 2/2013 | Schindler et al. |
| 9,919,726 | B2 | 3/2018 | Labbe et al. |
| 11,884,353 | B2 * | 1/2024 | Couture-Pelletier ....................... B62J 50/225 |

(Continued)

FOREIGN PATENT DOCUMENTS

| | | | | |
|---|---|---|---|---|
| EP | 3915862 A1 * | 12/2021 | ............ | B62K 11/02 |
| GB | 2406373 B | 9/2005 | | |

(Continued)

*Primary Examiner* — Drew J Brown
(74) *Attorney, Agent, or Firm* — Sandberg Phoenix & von Gontard, P.C.

(57) ABSTRACT

An adjustable riser assembly for a vehicle, wherein the riser assembly comprises a hollow outer body, an inner body telescopically slidingly disposable within the outer body, and a hand operated height adjustment pin assembly structured and operable to set and retain a selectable position of the inner body and a position of the outer body relative to each other to thereby set and retain and adjustable overall length of the adjustable riser assembly.

20 Claims, 10 Drawing Sheets

(56) References Cited

U.S. PATENT DOCUMENTS

| | | | | |
|---|---|---|---|---|
| 2002/0139217 A1* | 10/2002 | Montague | ............. | B62K 21/16 |
| | | | | 74/493 |
| 2003/0035682 A1* | 2/2003 | Chen | .................... | B62K 15/006 |
| | | | | 403/109.7 |
| 2003/0214112 A1* | 11/2003 | Chou | ..................... | B62K 21/18 |
| | | | | 280/278 |
| 2004/0239072 A1* | 12/2004 | Chou | ........................ | B62J 1/02 |
| | | | | 280/287 |
| 2007/0003361 A1 | 1/2007 | Wang | | |
| 2007/0068331 A1* | 3/2007 | Cutsforth | ............... | B62K 21/16 |
| | | | | 74/551.3 |
| 2008/0202280 A1* | 8/2008 | Olson | ................... | B62K 21/16 |
| | | | | 74/551.3 |
| 2009/0057505 A1* | 3/2009 | Chen | ..................... | B62K 21/24 |
| | | | | 248/185.1 |

FOREIGN PATENT DOCUMENTS

| | | | | |
|---|---|---|---|---|
| GB | 2601827 A * | 6/2022 | ............ | B62D 1/181 |
| WO | 2017071020 A1 | 5/2017 | | |

\* cited by examiner

ADJUSTABLE HANDLEBAR RISER

CROSS-REFERENCE TO RELATED APPLICATIONS

This application claims the benefit of U.S. Provisional Application No. 63/404,613, filed on Sep. 8, 2022. The disclosure of the above application is incorporated herein by reference in its entirety.

FIELD

The present teachings relate to steering assemblies for powersport vehicles, and more particularly to a steering system for powersport vehicles having an adjustable neck or riser assembly

BACKGROUND

The statements in this section merely provide background information related to the present disclosure and may not constitute prior art.

Powersports vehicles such as snowmobiles, ATVs, motorcycles, or personal watercraft often have steering assemblies that typically include a steering assembly that generally comprises as directional control device (e.g., a handlebar or a steering wheel), that is connected to a steering post or column that is in turn connected (either directly or via a linkage system) to one or more directional guide device (e.g., one or more wheel, ski, blade or rutter). In many instances the directional control device (e.g., the handlebar or the steering wheel) is fixed at a particular height and/or position and is not adjustable in height and/or position to ergonomically accommodate different vehicle operators. In other instances, such steering assemblies may provide a means for adjusting the height and/or position of the directional control device, however, such adjustment means are typically complicated, complex and cumbersome to adjust and require one or more hand tool (which the vehicle operator must provide) to disassemble and reassemble a portion of the steering assembly in order to adjust the height and/or position of the directional control device Examples of known adjustable height steering assemblies include designs that are considerably different from the invention disclosed below. For example, U.S. Pat. No. 9,919,726 discloses an adjustable handlebar riser body design that utilizing a flat-bottomed, V-shaped protrusion that is complex and requires external tools operate (i.e., tools that are not part of the steering assembly or vehicle). As another example, U.S. Pat. No. 7,685,904 discloses a pair of mounts for coupling a handlebar to a vehicle, including multiple elongated slots, which are also complex and requires external tools operate. As yet further examples, US20080264196A1 discloses a riser device with adjustment achieved through axially spaced groves and a detent member, seated and held in place with a collar, and U.S. Pat. No. 8,402,861 B2 discloses an eccentric cam device to achieve handlebar adjustment, both of which are also complex and requires external tools operate.

SUMMARY

The present disclosure generally provides a powersports vehicle (or other vehicle) user with easy adjustment of the height/position of an operator steering control (e.g., handlebars) of a steering assembly of the respective vehicle. Generally, the steering system includes an adjustable riser assembly structured and operable to adjust the height of the operator steering control (e.g., handlebars) rapidly via a height adjustment pin assembly, (e.g., a spring-loaded height adjustment pin assembly), without the use of external tools (i.e., tools not included in the adjustable riser assembly or the respective vehicle). This allows the user to customize the 'fit' of the height and/or position of the operator steering control to a desired height and riding style with greater convenience than is possible with current available products.

In various embodiments, the present disclosure provides an adjustable riser assembly for a vehicle, wherein the riser assembly comprises a hollow outer body, an inner body telescopically slidingly disposable within the outer body, and a hand operated height adjustment pin assembly structured and operable to set and retain a selectable position of the inner body and a position of the outer body relative to each other to thereby set and retain and adjustable overall length of the adjustable riser assembly.

In various other embodiments, the present disclosure provides a steering assembly for a vehicle, wherein the steering assembly comprises a steering post, an operator control device, and an adjustable riser connected to the steering post at a lower end of the adjustable riser and connected to the operator control device at an upper end. In various embodiments, the riser assembly comprises a hollow outer body, an inner body telescopically slidingly disposable within the outer body, and a hand operated height adjustment pin assembly structured and operable to set and retain a selectable position of the inner body and a position of the outer body relative to each other to thereby set and retain and adjustable overall length of the adjustable riser assembly.

In yet other embodiments, the present disclosure provides a vehicle comprising a steering assembly, wherein the steering assembly comprises a steering post, an operator control device, and an adjustable riser connected to the steering post at a lower end of the adjustable riser and connected to the operator control device at an upper end. In various embodiments, the riser assembly comprises a hollow outer body, an inner body telescopically slidingly disposable within the outer body, and a hand operated height adjustment pin assembly structured and operable to set and retain a selectable position of the inner body and a position of the outer body relative to each other to thereby set and retain and adjustable overall length of the adjustable riser assembly.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
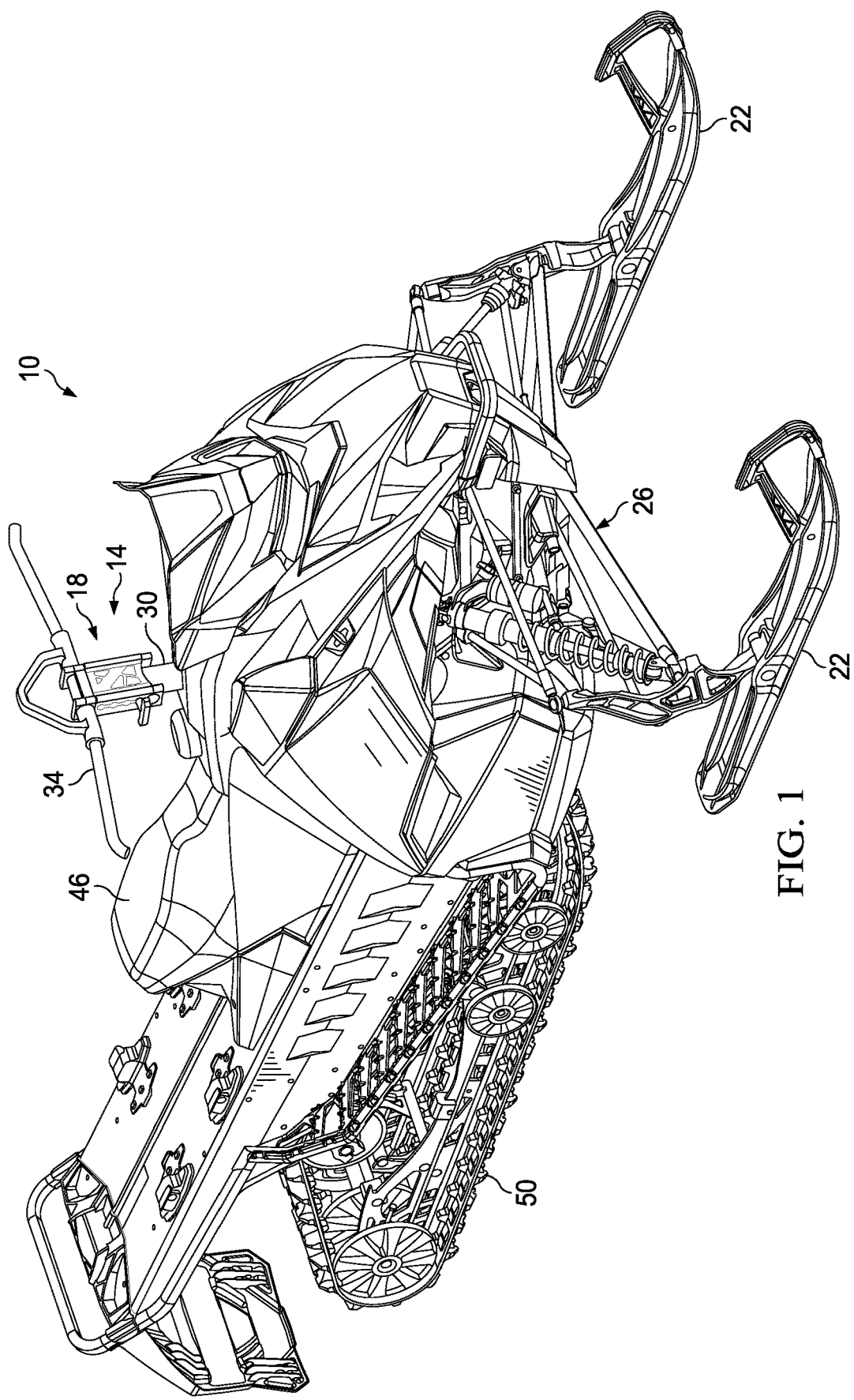
FIG. 1 is an exemplary isometric view of a vehicle comprising an adjustable riser assembly in accordance with various embodiments of the present disclosure.
Figure 2:
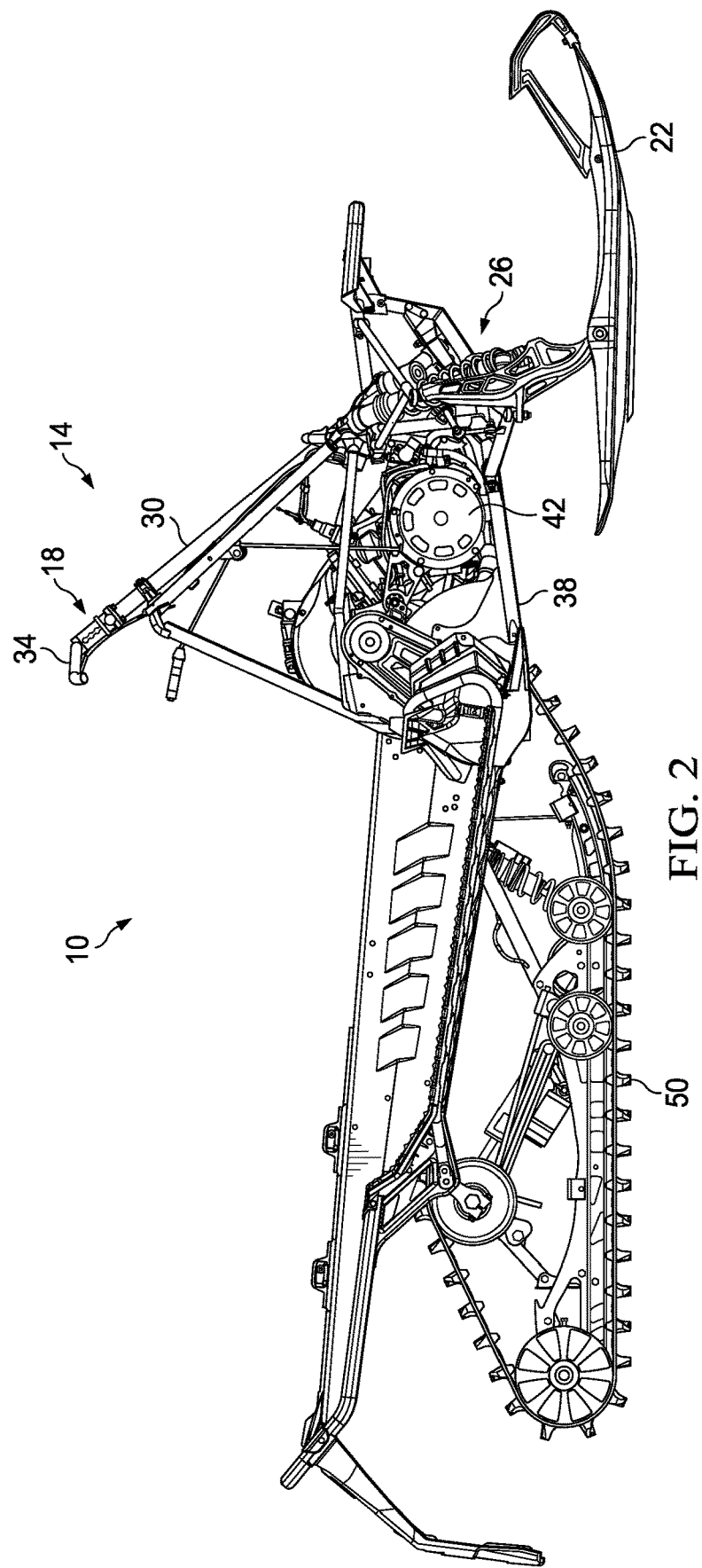
FIG. 2 is a side view of the vehicle and the adjustable riser assembly show in FIG. 1, in accordance with various embodiments of the present disclosure.
Figure 3:
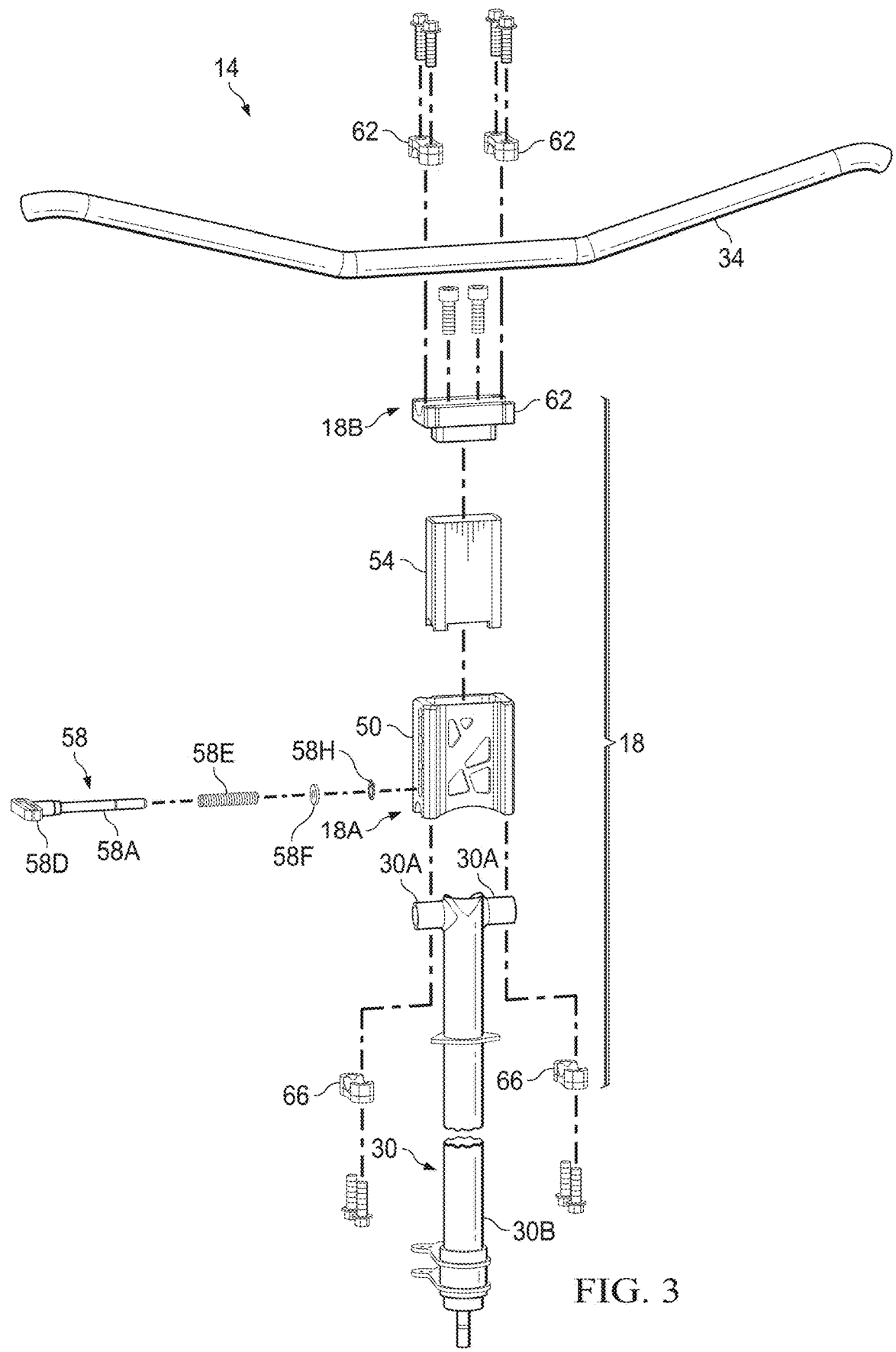
FIG. 3 is an exemplary exploded view of a steering system of the vehicle shown in FIGS. 1 and 2, wherein the steering system comprises the adjustable riser assembly (but is absent a vehicle directional control device and a steering linkage assembly described below), in accordance with various embodiments of the present disclosure.
Figure 4:
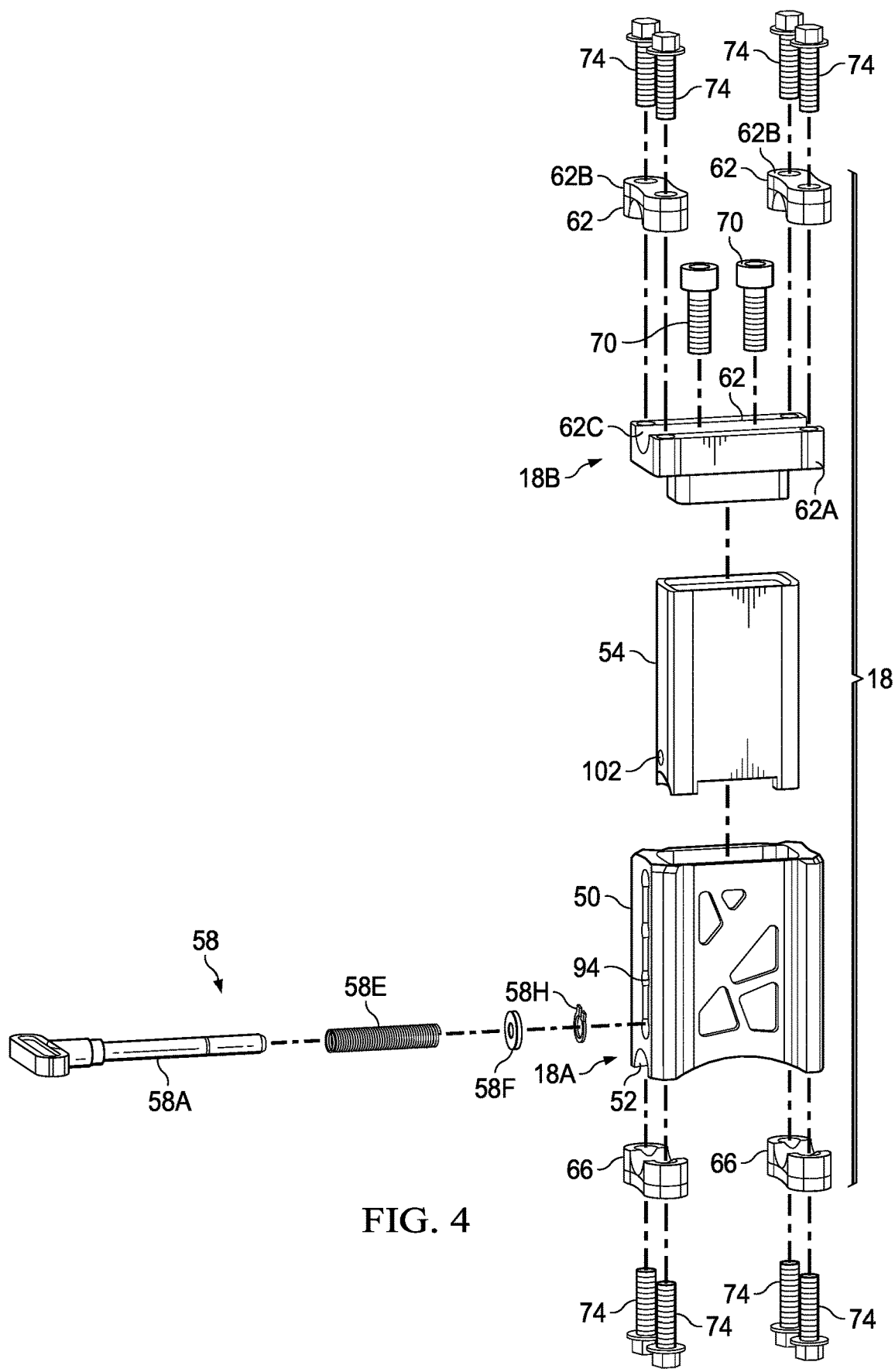
FIG. 4 is an exemplary exploded view of the adjustable riser assembly shown in FIGS. 1, 2, and 3, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts or causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Referring to FIGS. 1, 2, 3 and 4, in various embodiments the present disclosure provides a vehicle 10, e.g., a powersports vehicle, having a steering assembly 14 that comprises an adjustable riser assembly 18. The adjustable riser assembly 18 is structured and operable to allow a user (e.g., an operator of the vehicle 10) to easily adjust the height and/or position of an operator control device 34 (e.g., steering wheel or a steering handlebar) that is connected to the adjustable riser assembly 18. Generally, as described in detail below, configuring, adjusting or setting of the adjustable riser assembly 18, and hence the operator control device 34, can be performed rapidly via a spring-loaded hand operated height adjustment pin assembly 58, without the use of tools that are not part of the adjustable riser assembly 18. This allows the user to ergonomically customize the height and/or position of the operator control device 34 to a desired height and riding style with greater convenience than is possible with current available products.

The steering assembly 14 generally comprises at least one vehicle directional control device 22 (e.g., one or more wheel or ski), a steering linkage assembly 26, a steering post 30, the adjustable riser assembly 18, and the operator control device 34. More specifically, the directional control device(s) 22 is/are operably connected to the steering linkage assembly 26, which is operably connected to the steering post 30. The steering post 30 is connected to the adjustable riser assembly 18 at a first or lower end 18A, and the operator control device 34 is connected to the adjustable riser assembly 18 at a second or upper end 18B, such that the adjustable riser assembly 18 is disposed between and operably connects the operator control device 34 and the steering post 30. It should be readily understood that, as a result of the interconnections of operator control device 34, the adjustable riser assembly 18, the steering post 30, steering linkage assembly 26 and the vehicle directional control device(s) 22, an operator can control the directional orientation of the vehicle directional control device(s) 22, and hence the direction of travel or movement of the vehicle 10, via operation of the operator control device 34.

Although the vehicle 10 is exemplarily described and illustrated herein as a powersports vehicle, e.g., a snowmobile, the steering system adjustable riser assembly 18 disclosed herein can be utilized with any vehicle that comprises a steering system (such as steering system 10 that includes a steering post (such as steering post 30) and an operator control device (such as operator control device 34) that connectable to the steering post. For example, in various embodiments the vehicle 10 can be any power sport vehicle or off-road vehicle such as snowmobiles, snow bikes, watercrafts, and all-terrain vehicles (ATVs), or other vehicles including, but limited to, utility task vehicles (UTVs), recreational off-highway vehicles (ROVs), side-by-side vehicles (SSV), worksite vehicles, cargo vehicles, shuttle vehicles, buggies, motorcycles, tactical vehicles, golf cars, personal transport vehicles, worksite vehicles, airport ground support vehicles, factory and warehouse vehicles, turf maintenance vehicles, etc. Additionally, as described above, the adjustable riser assembly 18 of the present disclosure is structured and operable to provide a means for adjusting the height and/or position of the operator control device 34 to ergonomically accommodate different vehicle operators. Moreover, the adjustable riser assembly 18 of the present disclosure is structured and operable to allow an operator to adjust the height and/or position of the operator control device 34 using only his/her hands, without the use or need for any separate and independent hand tool that is not part of the adjustable riser assembly 18, e.g., without the use or need for a screw driver, a wrench, a set of pliers, hammer, sockets and/or any other known or specialized tool that is separate and independent from the adjustable riser assembly 18.

The vehicle 10 further generally comprises a chassis or frame 38, a prime mover 42 (e.g., an internal combustion engine (ICE) and/or an electric motor) mounted to the chassis 38, and an operator/passenger seat 46. The prime mover 42 is structured and operable to generate and deliver power (e.g., torque), via a drivetrain or otherwise, to one or more vehicle propulsion element 50, such as one or more wheel, one or more drive track, one or more propeller, one or more water jet, etc., in order to provide motive force that will propel the vehicle 10 forward and/or backward.

Referring now to FIGS. 1, 2, 3, 4, 5, 6, 7 and 8, in various embodiments the adjustable riser assembly 18 comprises a hollow outer body 50, an inner body 54 that is telescopically slidingly disposable within the outer body 50 and the a hand operated height adjustment pin assembly 58 that is structured and operable to select, set and retain the position of the inner body 54 and the outer body 50 relative to each other. Particularly, the hand operated height adjustment pin assembly 58 is structured and operable to select, set and retain a position of the inner body 54 within the outer body 54 to control and selectively set the height and position of the operator control device 34. The adjustable riser assembly 18 further includes an operator control device mounting bracket assembly 62 that is connectable to the inner body 54 and is structured and operable to mount the operator control device 34 to the inner body 54, and one or more U-shaped mounting clamp 66 that is/are connectable to the outer body 50 and is structured and operable to connect the steering post 30 to the outer body 50. More particularly, in various embodiments, the outer body 50 is fixedly connectable to the steering post 30 via the U-shaped mounting clamp(s) 66, and the operator control device 34 is fixedly connectable to the inner body 54 via the operator control device mounting bracket assembly 62 such that telescopic adjustment of the position of the inner body 50 within the outer body 50 as described herein will adjust the height of the operator control device 34 (e.g., selectively raise and lower the height of operator control device 34) so that a height and/or position of the operator control device 34 can be ergonomically adjusted to accommodate different vehicle operators.

Although the adjustable riser assembly 18 is exemplarily described herein as having the inner body 54 being connectable to the operator control device 34, and the outer body 50 being connectable to the steering post 30, it is envisioned that in various embodiments the adjustable riser assembly 18 can be constructed such that the inner body 54 is connectable to the steering post 30, and the outer body 50 is connectable the operator control device 34, and remain within the scope of the present disclosure.

In various embodiments, the operator control device mounting bracket assembly 62 comprises a base 62A that is connectable to the inner body 54 and one or more U-shaped mounting clamp 62B that is/are connectable to the base 62A. In an exemplary embodiment, to mount the operator control device 34 to the inner body 54 the operator control device mounting bracket assembly base 62A is connected to the inner body 54 using one or more fixation devices 70 (e.g., one or more bolt, screw, rivet, clamp, etc.), thereby fixedly connecting the base 62A to the inner body 54. Thereafter, a portion of the operator control device 34 is disposed within a channel 62C formed within the base 62A such that the U-shaped mounting clamp(s) 62B can be placed over the portion of the of the operator control device 34 disposed within a disposition channel 62C and connected to the base 62A via one or more fixation devices 74 (e.g., one or more bolt, screw, rivet, clamp, etc.), thereby clamping and retaining the operator control device 62 within the channel 62C and operably connecting the operator control device 62 to the inner body 54.

In an exemplary embodiment, to connect the outer body 50 to the steering post 30 a pair of mounting bosses 30A (in various embodiments knurled bosses 30A) that extend substantially orthogonally from a proximal end (or first end) of a steering post main column 30B are disposed within recesses 52 formed in distal ends of opposing side walls of the outer body 50. Thereafter, the U-shaped mounting clamp(s) 66 can be placed over the mounting bosses 30A disposed within a recesses 52 of the outer body 50 and connected to the outer body 50 via one or more fixation devices 78 (e.g., one or more bolt, screw, rivet, clamp, etc.), thereby clamping and retaining steering post mounting bosses 30A within the recesses 52 and connecting the steering post 30 to the outer body 50. Hence, when the inner body 54 having the operator control device 34 mounted thereto as described above is slidingly disposed within the outer body 50 having the steering post 30 connected thereto as described above, the operator control device 34 is operatively connected to the steering post 30, and thereby operatively connected to the vehicle directional control device(s) 22.

Referring now to FIGS. 5, 6, 7, 8, 9 and 10, as described above, the inner body 54 is slidingly disposed within the outer body 50 such that the inner body 54 and the outer body 50 can telescopically move relative to each other. For example, in various embodiments wherein the outer body 50 is fixedly connected to the steering post 30, the inner body 54 can telescopically slide within the outer body 50 in order to adjust the height and/or position of the operator control device 34. Or, alternatively, in other embodiments wherein the inner body 54 is fixedly connected to the steering post 30, the outer body 50 can telescopically slide about or around the inner body 54 in order to adjust the height and/or position of the operator control device 34. Additionally, in various embodiments, the inner and outer bodies 54 and 50 are fabricated such that there is little space, e.g., 0.010 inches between an outer surface 82 of the inner body 54 and an inner surface 86 of the hollow outer body 50. In such embodiments, little or no lubricant is needed to be disposed between the inner body outer surface 82 and the outer body inner surface 86. Furthermore, it is envisioned that the inner and outer bodies 54 and 50 can be fabricated using any suitable material, metal or composite and utilizing any suitable manufacturing method, e.g., extrusion, injection molding, milling, etc.

As described above, the outer body 50 is generally hollow. More particularly, the outer body 50 comprises a front wall 50A, a back wall 50B, a first sidewall 50C and a second sidewall 50D that are connected or integrally formed together and define an internal lumen 50E in which the inner body 54 is telescopically slidingly disposed. In various embodiments, the outer body first sidewall 50C comprises an elongated adjustment slot 90 formed therethrough and longitudinally extending along a length of the first sidewall 50C. In various embodiments, the adjustment slot 90 is formed within the first sidewall 50C to have a width W that is substantially the same dimension as a diameter D of a barrel 58A of the height adjustment pin assembly 58 (e.g., the width W can be 0.010 to 0.020 inches larger than the diameter D) such that the barrel 58A can bidirectionally slidingly move longitudinally up and down in the $Y^+$ and $Y^-$ directions within and along the length of the adjustment slot 90, and also bidirectionally slidingly move laterally back and forth in the $X^+$ and $X^-$ directions across the adjustment slot 90.

The first sidewall 50C additionally comprises a plurality of pin collar recesses 94 formed therein and extending partially therethrough (e.g., the pin collar recesses 94 can extend 20% to 80% through a thickness T of the first sidewall 50C). In various instances, the pin collar recesses 94 are evenly spaced along a length of the adjustment slot 90. However, alternatively, in various instances, the pin collar recesses 94 can be unevenly spaced along the length of the adjustment slot 90. As described below, the pin collar recesses 94 are sized and shaped to receive a collar 58B integrally formed with or disposed at a proximal end of the barrel 58A of the height adjustment pin assembly 58. The collar 58B has a diameter F that is greater than the diameter D of the barrel 58A. Additionally, in various embodiments, the outer body second sidewall 50D comprises a plurality of adjustment holes 100 formed therein and extending therethrough that are sized and shaped to slidingly receive a distal end portion of the of the height adjustment pin assembly barrel 58A. Particularly, the adjustment holes 100 are structured and operable to slidingly receive the distal end portion of the of the height adjustment pin assembly barrel 58A such that the position of the inner body 54 within and relative to the outer body 50 can be adjusted and selected such that a height and/or position of the operator control device 34 can be adjusted and selected, as described below. The adjustment holes 100 have a diameter S that is substantially the same as a diameter P of the pin assembly barrel 58A (e.g., the diameter S can be 0.010 to 0.020 inches larger than the diameter P). Additionally, in various embodiments, the adjustment holes 100 are evenly spaced along a length of the outer body second sidewall 50D and are coaxially aligned with the collar recesses 94 in the outer body first sidewall 50C such that an axis thereof is substantially orthogonal with the outer body first and second sidewalls 50C and 50D. However, alternatively, in various instances, the adjustment holes 100 can be unevenly spaced along a length of the outer body second sidewall 50D and coaxially aligned with the collar recesses 94 in the outer body first sidewall 50C such that an axis thereof is substantially orthogonal with the outer body first and second sidewalls 50C and 50D.

Furthermore, in various embodiments, the inner body 54 comprises a header 54A that includes one or more fixation device receiver 98 structured and operable to receive and fixedly mate with the one or more fixation devices 70 to secure the operator control device mounting bracket assembly base 62A to the inner body 54 as described above. Additionally, in various embodiments, the inner body 54 comprises an internal cavity 54B disposed adjacent the header 54A and defining a front wall 54C, a back wall 54D, a first sidewall 54E and a second sidewall 54F. In various embodiments, the inner body first and second sidewalls 54E and 54F each include a barrel orifice 102 that are sized and shaped to slidingly receive the height adjustment pin assembly barrel 58A. The barrel orifices 102 are coaxially aligned with each other such that an axis thereof is substantially orthogonal with the inner body first and second sidewalls 54E and 54F. The barrel orifices are structured and operable to slidingly receive the barrel 58A of the height adjustment pin assembly 58. More particularly, as described below, when the adjustable riser assembly 18 is assembled, the height adjustment pin assembly barrel 58A is slidingly disposed within and extends through the adjustment slot 90 in the outer body 50 first sidewall 50C, both of the height adjustment barrel orifices 102 in the inner body first and second sidewalls 54E and 54F, and a selected one of the adjustment holes 100 in the outer body second sidewall 50D. Furthermore, as also described further below, the height adjustment pin assembly 58 can be retracted to move the barrel 58A in the X$^+$ direction and withdraw the distal end portion of the barrel 58A from the respective adjustment hole 100 in the outer body second sidewall 50D such that the inner body 54 can be telescopically slidingly moved within and relative to the outer body 50 to adjust and select an overall riser assembly length (RAL). As would be readily understood by one skilled in the art the adjustability and selectability of the overall riser assembly length RAL provides for the adjustability and selectability of the height and/or position of the operator control device 34.

Figure 9:
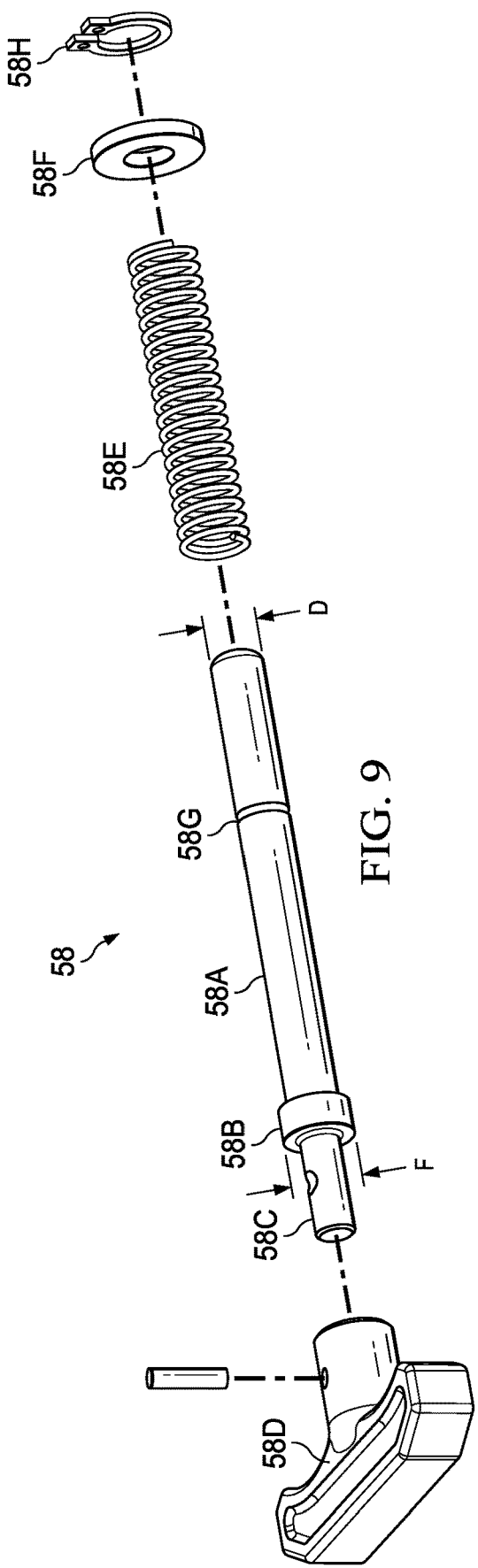
FIG. 9 is an exploded view of a height adjustment pin assembly of the adjustable riser assembly, in accordance with various embodiments of the present disclosure.
Figure 10:
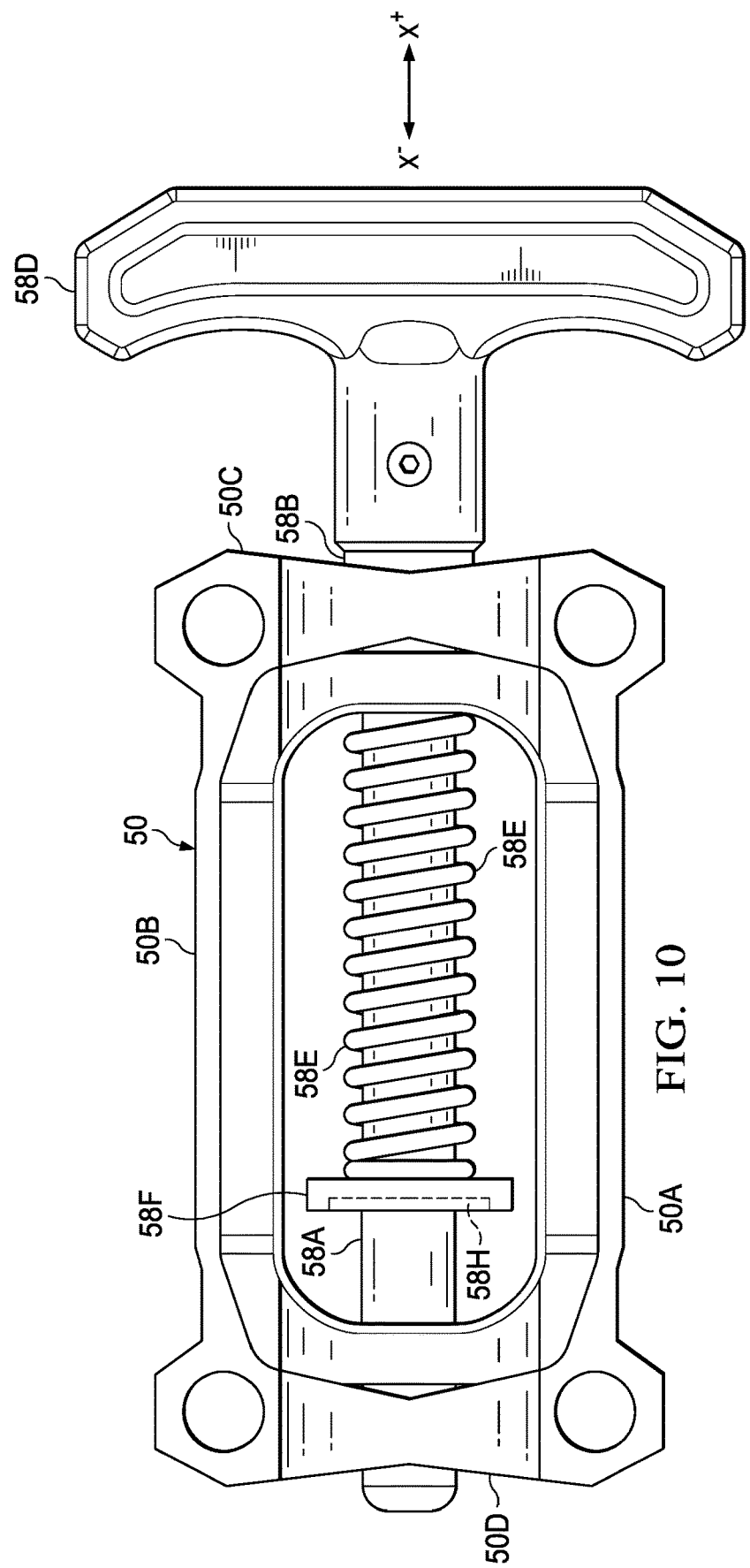
FIG. 10 is lateral cross-sectional view of the adjustable riser assembly shown in FIGS. 6, 7 and 8, in accordance with various embodiments of the present disclosure.

Referring particularly to FIGS. 9 and 10, in various embodiments, in addition to the barrel 58A and the collar 58B the height adjustment pin assembly 58 comprises a stem 58C, a handle 58D, and a biasing device 58E. The stem 58C is integrally formed with or disposed on the collar 58B and coaxially extends opposite from the collar 58B as the barrel 58A. The handle 58D is connectable to or integrally formed with the stem 58C such that the height adjustment pin assembly 58, particularly the barrel 58A, can be hand manipulated (e.g., absent the use of any tool not included in the height adjustment pin assembly 58) by a vehicle operator to bidirectionally move the height adjustment pin assembly 58, particularly the barrel 58A, back and forth in the X+ and X− directions. The biasing device 58E is disposable on and/or around the barrel 58A and is structured and operable to apply and maintain a constant force on the height adjustment pin assembly 58 in the X− direction. Particularly, when the adjustable riser assembly 18 is assembled, as described above, and an operator is not pulling the height adjustment pin assembly 58 in the X+ direction via the handle 58D, the constant force of the biasing device 58E on the height adjustment assembly 58 in the X− direction retains the height adjustment assembly in a deployed position wherein the distal end portion of the barrel 58A is disposed within a selected one of the adjustment holes 100 in the outer body second sidewall 50D and the pin assembly collar 58B is disposed within a corresponding selected one of the pin collar recesses 94 in the outer body first sidewall 50C. When the height adjustment pin assembly 58 is in the deployed position, the adjustable overall riser assembly length RAL is selectively fixed or set due to, and based on, the selected adjustment holes 100 the distal end portion of the barrel 58A is disposed in and the corresponding collar recess 94 the collar 58B is disposed in.

The biasing device 58E can be any biasing device suitable to apply and maintain a constant force on the height adjustment pin assembly 58 in the X− direction when an operator is not pulling the height adjustment pin assembly 58 in the X+ direction via the handle 58D. For example, in various embodiments, the biasing device 58E can be a coil spring disposed around the barrel 58A. Or, alternatively, in various embodiments, the biasing device can be a sleeve disposed around the barrel 58A that is fabricated of a resilient compressible material, or a pneumatic piston attached to the barrel 58A or comprising at least a part of the barrel 58A, or any other known and unknown type of biasing device. In various embodiments, wherein the biasing device 58E is a coil spring disposed around the barrel 58A (as exemplarily illustrated through the various figures), the height adjustment pin assembly 58 can further comprise as a retention washer 58F disposed around the barrel 58A and a C-clip 58H removably disposed around and retained within a retention washer channel 58G formed in and around a circumferential outer surface of the barrel 58A. In such embodiments, when the adjustable riser assembly 18 is assembled, the retention washer 58F is disposed around the barrel 58A and the C-clip 58H is removably disposed within the washer channel 58G and the biasing device/coil spring 58E is disposed around the barrel 58A between an inner surface of the inner body first sidewall 54E and the retention washer 58F in a partially compressed state. Therefore, when the height adjustment pin assembly 58 is not being pulled by an operator in the X+ direction via the handle 58D, the biasing device/coil spring 58E will apply a constant force on the height adjustment pin assembly 58 in the X− direction such that the distal end portion of the barrel is retained within a selected one of the adjustment holes 100 in the outer body second sidewall 50D and the pin assembly collar 58B is retained within a corresponding selected one of the pin collar recesses 94 in the outer body first sidewall 50C. That is, the height adjustment pin assembly 58 will be maintained in the deployed position via the force in the X− direction of the partially compressed biasing device/coil spring 58E.

Figure 5:
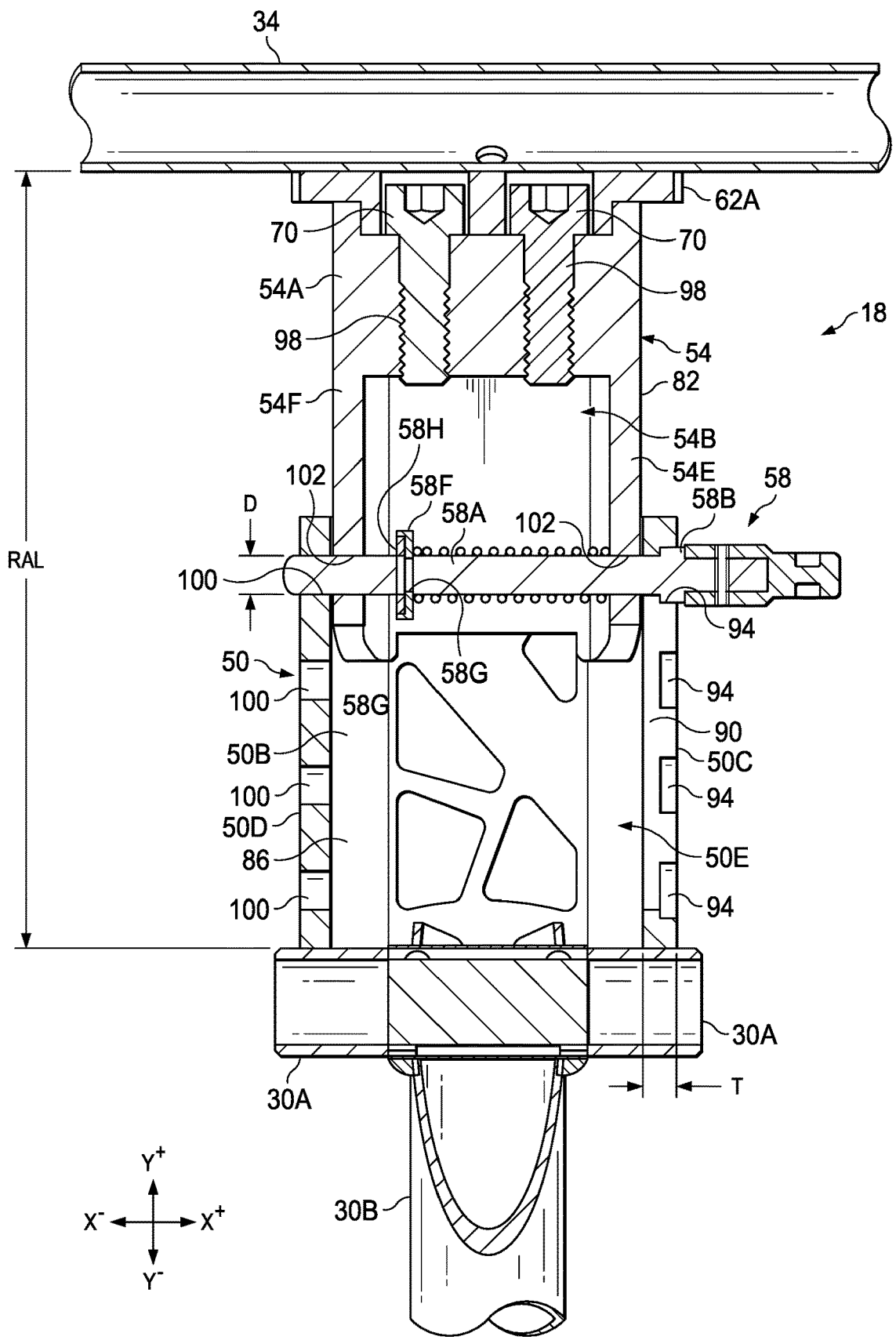
FIG. 5 is longitudinal cross-sectional view of the adjustable riser assembly shown in FIG. 8 configured in a fully deployed position, in accordance with various embodiments of the present disclosure.
Figure 6:
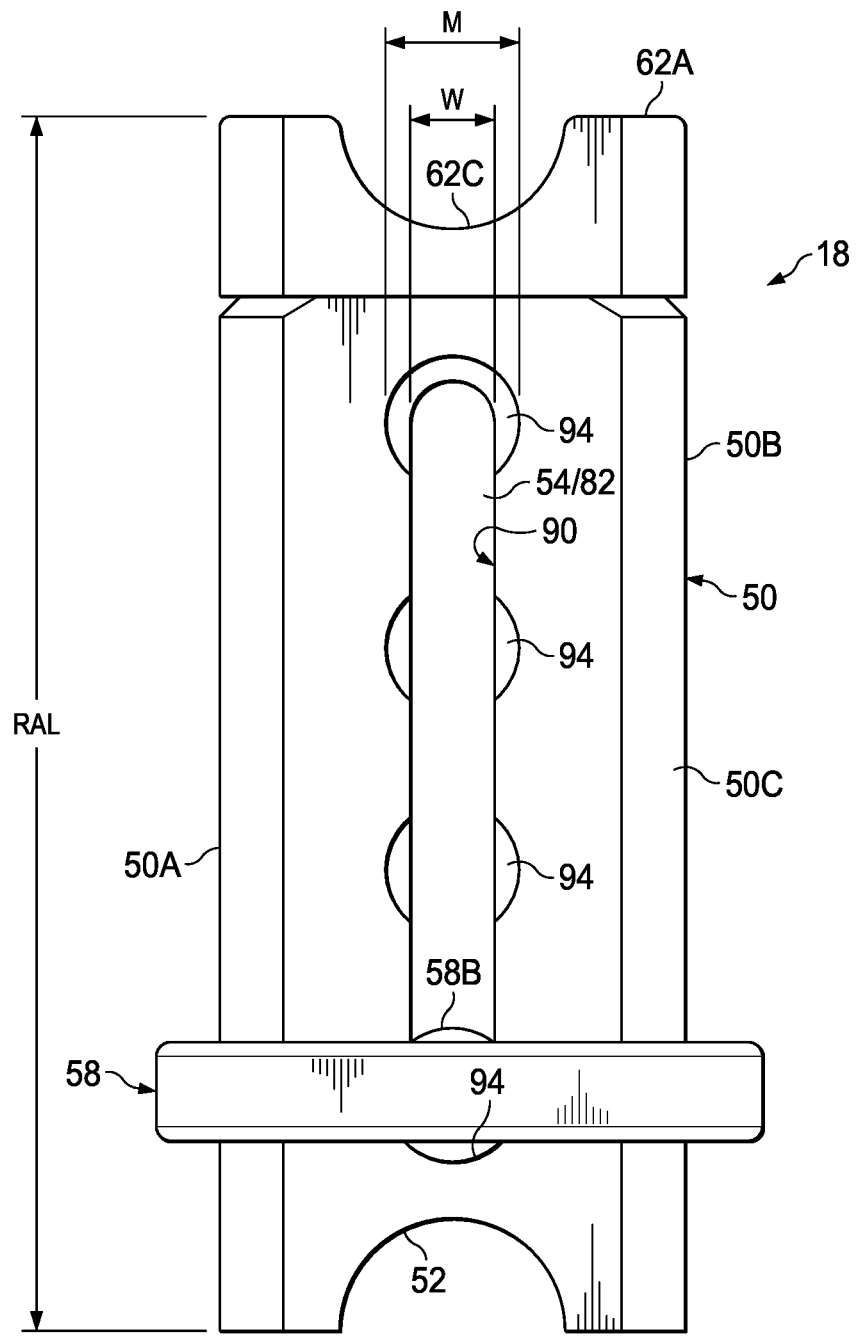
FIG. 6 is a first side view of the adjustable riser assembly shown in FIG. 4 configured in a fully retracted position, wherein a first side of the adjustable riser assembly comprises an elongated adjustment slot having a plurality pin collar recesses formed therein and evenly spaced along a length thereof, in accordance with various embodiments of the present disclosure.
Figure 7:
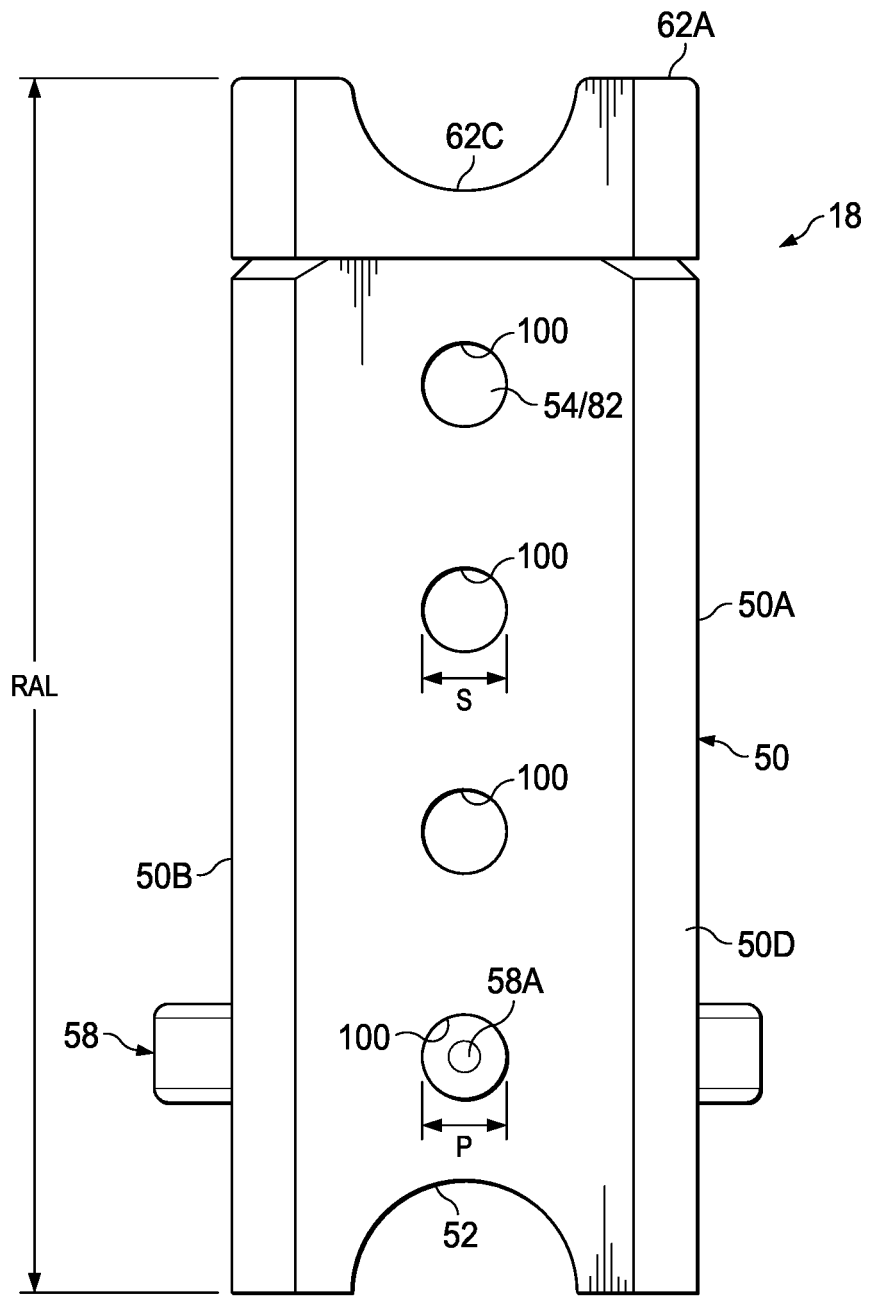
FIG. 7 is a second side view of the adjustable riser assembly shown in FIG. 4 configured in the fully retracted position, wherein a second side of the adjustable riser assembly comprises a plurality of pin shaft tail orifice formed therethrough, in accordance with various embodiments of the present disclosure.
Figure 8:
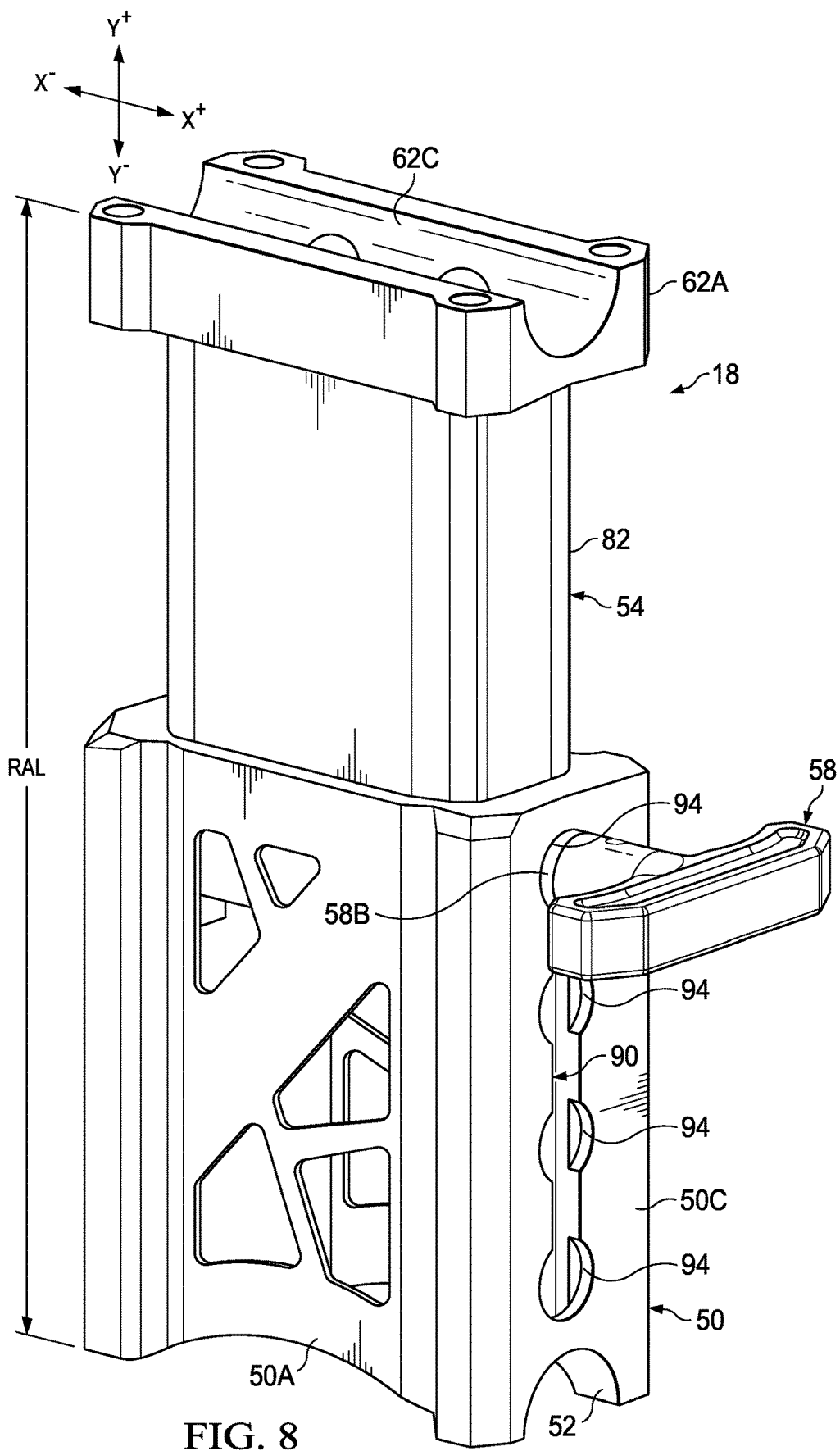
FIG. 8 is an exemplary isometric view of the adjustable riser assembly shown in FIG. 4 configured in the fully deployed position, wherein a second side of the adjustable riser assembly comprises a plurality of pin shaft tail orifice formed therethrough, in accordance with various embodiments of the present disclosure.

Referring now to FIGS. 1 through 10, but shown best in FIG. 5, when the adjustable riser assembly 18 is assembled, the inner body 54 is telescopically slidingly disposed within the outer body internal lumen 50E. Additionally, the height adjustment pin barrel 58A is disposed through and within the elongated adjustment slot 90 in the outer body first sidewall 50C and the barrel orifices 102 in the inner body first and second sidewalls 54E and 54F, and the distal end portion of the barrel 58A is at least partially disposed within a selected one of the adjustment holes 100 in the outer body second sidewall 50D. Furthermore, the biasing device 58E is disposed on or around the barrel 58A such that the biasing device 58E applies a constant force to the height adjustment pin assembly 58 in the X$^−$ direction, thereby retaining the distal end portion of the barrel 58A within a selected adjustment hole 100 and the collar 58B within the corresponding pin collar recess 94. As described above, the pin collar recesses extend only partially through the thickness T of the outer body first sidewall 50C and are sized and shaped to receive the collar 58B of the height adjustment pin assembly 58. As also described above, the elongated adjustment slot 90 has a width W that is substantially the same dimension as the diameter D of the barrel 58A, and the height adjustment pin assembly collar 58B has the diameter F that is greater than a diameter D of the barrel 58A. Hence, a diameter M of the pin collar recesses 94 is greater than the width W of the elongated adjustment slot 90. Accordingly, since the pin collar recesses 94 extend only partially through the thickness T of the outer body first sidewall 50C, when the height adjustment pin assembly 58 is in the deployed position, the collar 58B will be seated and retained within the selected collar recess 94 and against or abutting a bottom of the selected collar recess such that the height adjustment pin assembly will be retained in the deployed position. Additionally, in various embodiments, the diameter M of the pin collar recesses 94 is substantially the same as the diameter F the pin collar 58B (e.g., the diameter M can be 0.010 to 0.020 inches larger than the diameter F), such that when the pin collar 58B is disposed within any one of the recesses 94, the pin collar 58B is firmly or snuggly retained within the selected recess 94 (e.g., the pin collar 58B has little room to move laterally to a longitudinal axis of the barrel 58A and pin collar 58B within the selected recess 94).

To operate the adjustable riser assembly 18 and adjust the height and/or position of the operator control device 34 an operator grasps the handle 58D of the height adjustment pin assembly 58 absent the use of any tool not included in the height adjustment pin assembly 58 and pulls the height adjustment pin assembly 58 in the $X^+$ direction to overcome the force in the $X^-$ direction provided by the biasing device 58E, thereby retracting or withdrawing the distal end portion of the height adjustment pin assembly barrel 58A from the respective adjustment hole 102 in which it is disposed. If the operator wishes to raise the operator control device 34 (i.e., telescopically extend or increase the overall riser assembly length RAL), while maintaining the force in the $X^+$ direction on the height adjustment pin assembly 58 such that the height adjustment pin assembly 58 is held in the retracted position, the operator can grasp the operator control device 34 and/or the operator control device mounting bracket assembly 62 and/or a portion of whichever of the inner body 54 or outer body 50 the operator control device 34 is mounted to and pull in the $Y^+$ direction to move whichever of the inner body 54 or outer body 50 the operator control device 34 is mounted to in the $Y^+$ direction, thereby increasing the overall riser assembly length RAL and raising the operator control device 34. The operator will telescopically move whichever of the inner body 54 and the outer body 50 the operator control device 34 is mounted to increase the overall riser assembly length RAL until the distal end portion of the barrel 58A is aligned with a selected one of the adjustment holes 100 in the outer body second sidewall 50D. Particularly, the operator telescopically extends the adjustable riser assembly 18 until the distal end portion of the barrel 58A is aligned with a selected one of the adjustment holes 100, thereby raising the operator control device 34 to a desired height, more particularly increasing the overall riser assembly length RAL to a desired length. Subsequently, the operator can release the force on the height adjustment pin assembly 58 in the $X^+$ direction. When the force on the height adjustment pin assembly 58 in the $X^+$ direction is released, the force in the $X^-$ direction applied to the height adjustment pin assembly 58 by the biasing device 58E will deploy the distal end portion of the barrel 58A into the selected adjustment hole 100, thereby retaining the height adjustment pin assembly 58 in the deployed position and setting and retaining the operator control device 34 at the desired height and the overall riser assembly length RAL at the desired length.

Alternatively, if the operator wishes to lower the operator control device 34 (i.e., telescopically collapse or decrease the overall riser assembly length RAL), while maintaining the force in the $X^+$ direction on the height adjustment pin assembly 58 such that the height adjustment pin assembly 58 is held in the retracted position, the operator can grasp the operator control device 34 and/or the operator control device mounting bracket assembly 62 and/or a portion of whichever of the inner body 54 or outer body 50 the operator control device 34 is mounted to and push in the $Y^-$ direction to move whichever of the inner body 54 or outer body 50 the operator control device 34 is mounted to in the $Y^-$ direction, thereby decreasing the overall riser assembly length RAL and lowering the operator control device 34. The operator will telescopically move whichever of the inner body 54 and the outer body 50 the operator control device 34 is mounted to decrease the overall riser assembly length RAL until the distal end portion of the barrel 58A is aligned with a selected one of the adjustment holes 100 in the outer body second sidewall 50D. Particularly, the operator telescopically collapses the adjustable riser assembly 18 until the distal end portion of the barrel 58A is aligned with a selected one of the adjustment holes 100, thereby lowering the operator control device 34 to a desired height, more particularly decreasing the overall riser assembly length RAL to a desired length. Subsequently, the operator can release the force on the height adjustment pin assembly 58 in the $X^+$ direction. When the force on the height adjustment pin assembly 58 in the $X^+$ direction is released, the force in the $X^-$ direction applied to the height adjustment pin assembly 58 by the biasing device 58E will deploy the distal end portion of the barrel 58A into the selected adjustment hole 100, thereby retaining the height adjustment pin assembly 58 in the deployed position and setting and retaining the operator control device 34 at the desired height and the overall riser assembly length RAL at the desired length.

As described above, the plurality of pin collar recesses 94 are evenly spaced along a length of the adjustment slot 90 and the plurality of adjustment holes 100 are evenly spaced along a length of the outer body second sidewall 50D and coaxially aligned with the collar recesses 94. There can be any desired number of pin collar recesses 94 the adjustment holes 100, and the plurality of pin collar recesses 94 the adjustment holes 100 can be spaced apart an any desired equal or unequal increment. For example, in various embodiments, there can be four pin collar recesses 94 and adjustment holes 100 evenly spaced apart at increments of 1 inch to 4 inches apart, for instances evenly spaced apart at increments of 2½ inches apart.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. An adjustable riser assembly for a vehicle, said riser assembly comprising:
   a hollow outer body comprising a first sidewall, a second sidewall, and a plurality of adjustment holes formed in and extending through the second sidewall;
   an inner body telescopically slidingly disposable within the outer body; and
   a hand operated height adjustment pin assembly comprising a barrel, wherein the height adjustment pin assembly is structured and operable to selectively be placed in a deployed position wherein a distal end portion of the barrel is selectively placed within a selected one of the plurality of adjustment holes in the outer body second sidewall to thereby set and retain a selectable position of the inner body and a position of the outer body relative to each other to thereby set and retain an adjustable overall length of the adjustable riser assembly.

2. The assembly of claim 1, wherein the outer body further comprises:
   a front wall, a back wall, that together with the first and second sidewalls define an internal lumen in which the inner body is telescopically slidingly disposed;
   an elongated adjustment slot formed through and longitudinally extending along a length of the outer body first sidewall; and
   a plurality of pin collar recesses formed in the outer body first sidewall and disposed along a length of the adjustment slot.

3. The assembly of claim 2, wherein the inner body comprises a front wall, a back wall, a first sidewall, and a second sidewall, wherein the first and second sidewalls each comprise a barrel orifice.

4. The assembly of claim 3, wherein the height adjustment pin assembly further comprises:
   a collar disposed at a proximal end of the barrel;
   a stem disposed on the collar and coaxially extending opposite from the collar as the barrel;
   a handle connectable to the stem; and
   a biasing device structured and operable to apply a constant force on the height adjustment assembly.

5. The assembly of claim 4, wherein the height adjustment pin assembly is structured and operable to be retained in the deployed position via the constant force of the biasing device wherein the height adjustment pin assembly barrel is disposed through the outer body elongated slot, the inner body barrel orifices, the distal end portion of the barrel is disposed within the selected one of the plurality of outer body adjustment holes and the height adjustment pin collar is disposed within a selected one of the outer body pin collar recesses such that the selectable position of inner body and the outer body relative to each other is maintained and the adjustable overall length of the adjustable riser assembly is maintained at a selected length.

6. The assembly of claim 5, wherein the height adjustment pin is further structured and operable to be withdrawn, via a force applied to the handle in the opposite direction of the force applied by the biasing device, to a retracted position wherein the height adjustment pin assembly barrel distal end portion is withdrawn from the selected one of the outer body adjustment holes and the pin collar is withdrawn from the selected one of the collar recesses such that the inner and outer body can be moved relative to each other to adjust the overall length of the adjustable riser assembly.

7. The assembly of claim 6, wherein:
   the collar recesses extend partially through a thickness of the outer body first sidewall, and are sized and shaped to receive the height adjustment pin assembly collar and have a diameter substantially the same as a diameter of the height adjustment pin assembly collar;
   the adjustment slot have a width that is substantially the same as a diameter the height adjustment pin assembly barrel and less than the diameter of the height adjustment pin assembly collar; and
   the adjustment holes have a diameter that is substantially the same as a diameter of the height adjustment pin assembly barrel.

8. A steering assembly for a vehicle, said steering assembly comprising:
   a steering post;
   an operator control device; and
   an adjustable riser connected to the steering post at a lower end of the adjustable riser and connected to the operator control device at an upper end, said riser assembly comprising:
      a hollow outer body having a plurality of adjustment holes formed in and extending through a sidewall thereof;
      an inner body telescopically slidingly disposable within the outer body, the inner body comprising a first sidewall and second sidewall that each include a barrel orifice; and
      a hand operated height adjustment pin assembly comprising a barrel that extends through the barrel orifices of the inner body first and second sidewalls and is structured and operable to set and retain a selectable position of the inner body and a position of the outer body relative to each other by selectively aligning the barrel orifices of the inner body first and second sidewalls with selected ones of the plurality of adjustment holes formed in the outer body sidewall and extending the height adjustment pin assembly barrel through the selected ones of the plurality of adjustment holes formed in the outer body sidewall, to thereby set and retain and adjustable overall length of the adjustable riser assembly.

9. The steering assembly of claim 8, wherein the outer body comprises:
   a front wall, a back wall, a first sidewall, and a second sidewall that together define an internal lumen in which the inner body is telescopically slidingly disposed;
   an elongated adjustment slot formed through and longitudinally extending along a length of the outer body first sidewall;
   a plurality of pin collar recesses formed in the outer body first sidewall and disposed along a length of the adjustment slot; and
   a plurality of adjustment holes formed therein and extending through the outer body second sidewall.

10. The steering assembly of claim 9, wherein the inner body comprises a front wall, a back wall, a first sidewall, and a second sidewall, wherein the first and second sidewalls each comprise a barrel orifice.

11. The steering assembly of claim 10, wherein the height adjustment pin assembly further comprises:
   a collar disposed at a proximal end of the barrel;
   a stem disposed on the collar and coaxially extending opposite from the collar as the barrel;
   a handle connectable to the stem; and
   a biasing device structured and operable to apply a constant force on the height adjustment assembly.

12. The steering assembly of claim 11, wherein the height adjustment pin is structured and operable to be retained in a deployed position via the constant force of the biasing device wherein the height adjustment pin assembly barrel is disposed through the outer body elongated slot, the inner body barrel orifices, and distal end portion of the height adjustment pin assembly barrel is disposed within a selected one of the outer body adjustment holes and the height adjustment pin collar is disposed within a selected one of the outer body pin collar recesses such that the selectable position of inner body and the outer body relative to each other is maintained and the adjustable overall length of the adjustable riser assembly is maintained at a selected length.

13. The steering assembly of claim 12, wherein the height adjustment pin is further structured and operable to be withdrawn, via a force applied to the handle in the opposite direction of the force applied by the biasing device, to a retracted position wherein the height adjustment pin assembly barrel distal end portion is withdrawn from the selected one of the outer body adjustment holes and the pin collar is withdrawn from the selected one of the collar recesses such that the inner and outer body can be moved relative to each other to adjust the overall length of the adjustable riser assembly.

14. The steering assembly of claim 13, wherein:
the collar recesses extend partially through a thickness of the outer body first sidewall, and are sized and shaped to receive the height adjustment pin assembly collar and have a diameter substantially the same as a diameter of the height adjustment pin assembly collar;
the adjustment slot have a width that is substantially the same as a diameter the height adjustment pin assembly barrel and less than the diameter of height adjustment pin assembly collar; and
the adjustment holes have a diameter that is substantially the same as a diameter of the height adjustment pin assembly barrel.

15. A vehicle, said vehicle comprising:
a steering assembly comprising:
a steering post;
an operator control device; and
an adjustable riser connected to the steering post at a lower end of the adjustable riser and connected to the operator control device at an upper end, said riser assembly comprising:
a hollow outer body;
an inner body telescopically slidingly disposable within the outer body; and
a hand operated automatically biased height adjustment pin assembly, the height adjustment pin assembly comprising a biasing device disposed within the inner body that is structured and operable to constantly bias the height adjustment pin assembly to a deployed position to set and retain a selectable position of the inner body and a position of the outer body relative to each other to thereby set and retain and adjustable overall length of the adjustable riser assembly.

16. The steering assembly of claim 15, wherein the outer body comprises:
a front wall, a back wall, a first sidewall, and a second sidewall that together define an internal lumen in which the inner body is telescopically slidingly disposed;
an elongated adjustment slot formed through and longitudinally extending along a length of the outer body first sidewall;
a plurality of pin collar recesses formed in the outer body first sidewall and disposed along a length of the adjustment slot; and
a plurality of adjustment holes formed therein and extending through the outer body second sidewall.

17. The steering assembly of claim 16, wherein the inner body comprises a front wall, a back wall, a first sidewall, and a second sidewall, wherein the first and second sidewalls each comprise a barrel orifice.

18. The steering assembly of claim 17, wherein the height adjustment pin assembly further comprises:
a barrel;
a collar disposed at a proximal end of the barrel;
a stem disposed on the collar and coaxially extending opposite from the collar as the barrel;
a handle connectable to the stem; and
the biasing device structured and operable to apply a constant force on the height adjustment pin assembly to thereby bias the height adjustment pin assembly to the deployed position.

19. The steering assembly of claim 18, wherein the height adjustment pin is structured and operable to be retained in the deployed position via the constant force of the biasing device wherein the height adjustment pin assembly barrel is disposed through the outer body elongated slot, the inner body barrel orifices, and distal end portion of the height adjustment pin assembly barrel is disposed within a selected one of the outer body adjustment holes and the height adjustment pin collar is disposed within a selected one of the outer body pin collar recesses such that the selectable position of inner body and the outer body relative to each other is maintained and the adjustable overall length of the adjustable riser assembly is maintained at a selected length.

20. The steering assembly of claim 19, wherein the height adjustment pin is further structured and operable to be withdrawn, via a force applied to the handle in the opposite direction of the force applied by the biasing device, to a retracted position wherein the height adjustment pin assembly barrel distal end portion is withdrawn from the selected one of the outer body adjustment holes and the pin collar is withdrawn from the selected one of the collar recesses such that the inner and outer body can be moved relative to each other to adjust the overall length of the adjustable riser assembly.

* * * * *